US009473420B2

(12) United States Patent
Cors et al.

(10) Patent No.: US 9,473,420 B2
(45) Date of Patent: *Oct. 18, 2016

(54) METRICS AND FORWARDING ACTIONS ON LOGICAL SWITCH PARTITIONS IN A DISTRIBUTED NETWORK SWITCH

(71) Applicant: International Business Machines Corporation, Armonk, NY (US)

(72) Inventors: Josep Cors, Rochester, MN (US); Ward R. Nelson, Stewartville, MN (US); Daniel E. Pradilla, Los Gatos, CA (US); Chandramouli Radhakrishnan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 507 days.

This patent is subject to a terminal disclaimer.

(21) Appl. No.: 13/827,540

(22) Filed: Mar. 14, 2013

(65) Prior Publication Data

US 2014/0269273 A1  Sep. 18, 2014

Related U.S. Application Data

(63) Continuation of application No. 13/801,137, filed on Mar. 13, 2013, now Pat. No. 9,282,056.

(51) Int. Cl.
*H04L 12/927* (2013.01)
*H04L 12/931* (2013.01)

(52) U.S. Cl.
CPC .............. *H04L 47/80* (2013.01); *H04L 49/70* (2013.01)

(58) Field of Classification Search
USPC ................................................. 370/389, 230
See application file for complete search history.

(56) References Cited

U.S. PATENT DOCUMENTS

| 7,782,856 | B1 | 8/2010 | Larsen et al. |
| 2005/0175022 | A1 | 8/2005 | Nishimura et al. |
| 2007/0022474 | A1* | 1/2007 | Rowett ............... H04L 63/0218 726/11 |
| 2007/0022479 | A1 | 1/2007 | Sikdar et al. |
| 2008/0285551 | A1* | 11/2008 | Ashok et al. ................. 370/389 |
| 2011/0085557 | A1 | 4/2011 | Gnanasekaran et al. |
| 2011/0302287 | A1* | 12/2011 | Muppirala et al. ........... 709/223 |

(Continued)

OTHER PUBLICATIONS

Onisick, Joe, "Access Layer Network Virtualization: VN-Tag and VEPA," DefineTheCloud, available at http://www.definethecloud.net/access-layer-network-virtualization-vn-tag-and-vepa, Sep. 12, 2010, pp. 1-10.

(Continued)

*Primary Examiner* — Dang Ton
*Assistant Examiner* — Pamit Kaur
(74) *Attorney, Agent, or Firm* — Patterson + Sheridan, LLP

(57) ABSTRACT

Techniques are provided for providing access control lists in a distributed network switch. The distributed network switch made of switch units is divided into logical switch partitions, or logical networks. Physical ports of the switch units are partitioned into logical ports, where each logical port is associated with a logical switch partition. A control point of the distributed network switch manages and assigns a service tag (S-Tag) used to identify which logical port ingress and egress frames are associated with. To generate metrics and other forwarding actions for a given logical switch partition, the control point sets up access control list (ACLs) targeting the logical port associated with the S-Tags associated with the given logical switch partition.

9 Claims, 4 Drawing Sheets

(56) References Cited

U.S. PATENT DOCUMENTS

| | | |
|---|---|---|
| 2012/0063311 A1 | 3/2012 | Sarwar et al. |
| 2012/0147898 A1 | 6/2012 | Koponen et al. |
| 2014/0003442 A1* | 1/2014 | Hernandez et al. .......... 370/401 |
| 2015/0172126 A1 | 6/2015 | Xiao et al. |

OTHER PUBLICATIONS

Merchant, Shehzad, "VEPA: An answer to virtual switching," Network World, available at http://www.networkworld.com/news/tech/2010/101223techupdate-vepa.html, Dec. 23, 2010, pp. 1-3.

* cited by examiner

METRICS AND FORWARDING ACTIONS ON LOGICAL SWITCH PARTITIONS IN A DISTRIBUTED NETWORK SWITCH

CROSS-REFERENCE TO RELATED APPLICATIONS

This application is a continuation of co-pending U.S. patent application Ser. No. 13/801,137, filed Mar. 13, 2013. The aforementioned related patent application is herein incorporated by reference in its entirety.

BACKGROUND

Embodiments of the invention generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the invention provide a method, product, and system for providing metrics for a distributed network switch comprised of a plurality of logical switch partitions including a first logical switch partition. A method according to one embodiment includes receiving a request that specifies an action targeting frames associated with the first logical switch partition and received on a physical port of the distributed network switch. The physical port may include a logical port associated with one of the plurality of logical switch partitions. The method further includes determining a service tag assigned to the logical ports associated with the first logical switch partition. The method includes generating a plurality of access control lists (ACLs) having conditions that specify the logical port specified by the determined service tag and a corresponding action to perform the specified action targeting frames associated with the first logical switch partition.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

Figure 1:
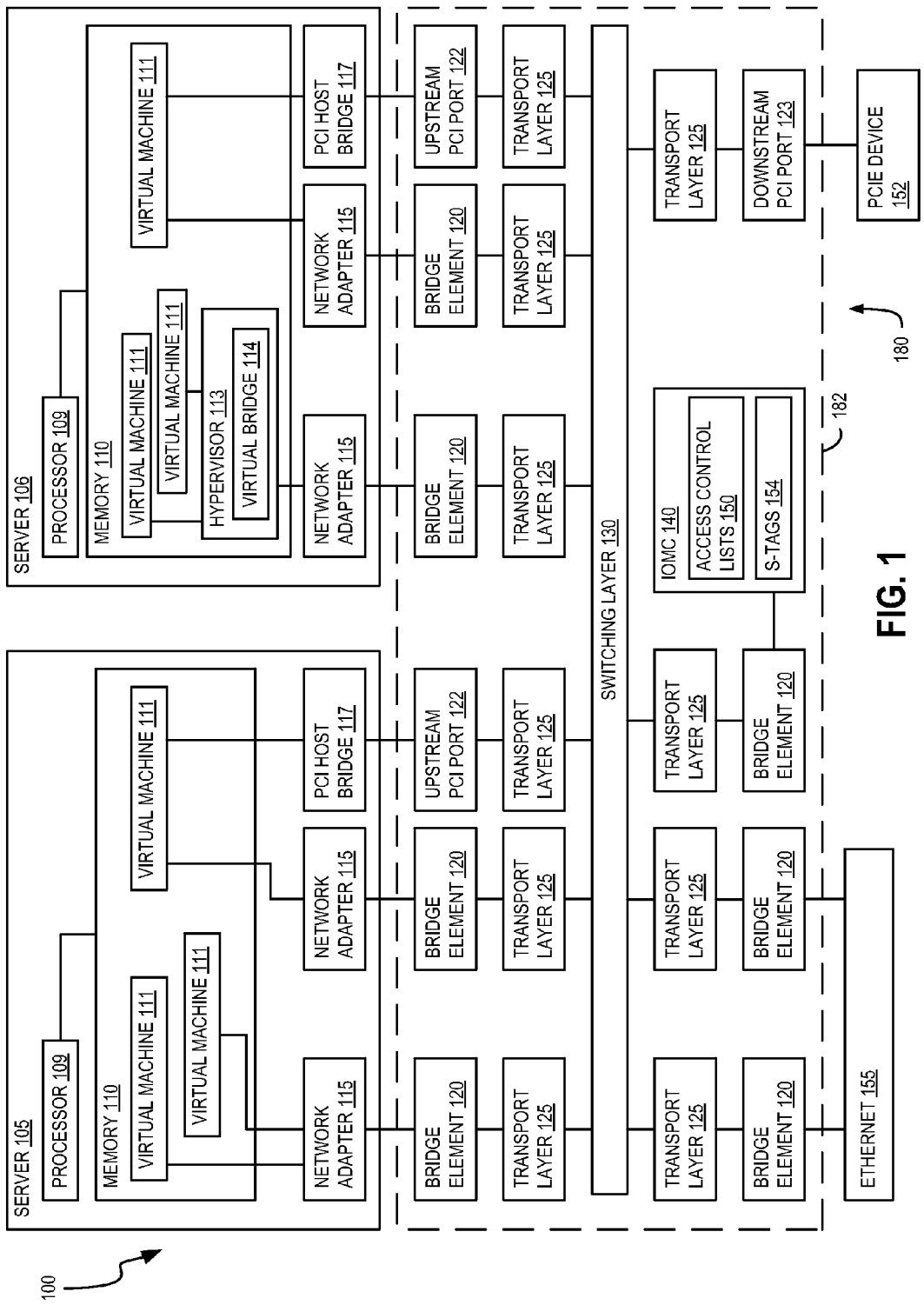
FIG. 1 illustrates a system architecture that includes a distributed network switch, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present disclosure provide techniques for managing network traffic in a distributed network switch. In one embodiment, the distributed network switch may be divided into logical switch partitions, or logical networks (LNs), which may act as independent Layer 2 domains. Creating an access control list (ACL) that triggers on a logical network has been difficult in conventional networks because traffic may be internally segregated without being able to expose a field (e.g., in Ethernet frames) that can be matched in an ACL rule. In one embodiment of the invention, the distributed network switch is configured to partition physical ports into a plurality of logical ports. The distributed network switch may tag network traffic with service tags (S-Tags) to associate the traffic with a given logical port. The distributed network switch is further configured to assign the S-Tags such that a same S-TAG is used across all logical ports belonging to a logical network. In one embodiment, the distributed network switch is configured to generate a plurality of ACLs that target the logical port associated with the assigned S-Tag, the Logical Port being connected to one and only one logical network, thereby providing actions that are triggered on a particular logical network. Examples of actions that may be triggered on a logical network include forwarding actions and metrics, such as utilization metrics for a given logical network.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture 100 that includes a distributed network switch 180, according to one embodiment of the invention. The computer system 100 includes a first and second server 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the network adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the network adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. The bridge elements 120 of the distributed network switch 180 may be organized into a switch unit 182 (sometimes referred to as a chassis interconnect element or CIE). In some embodiments, the distributed network switch 180 may include a plurality of such switch units, though a single switch unit 182 is depicted in FIG. 1 for clarity of illustration. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 125 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

Each bridge element 120 may be a distributed Virtual Ethernet bridge (dVEB) configured to forward data frames throughout the distributed network switch 180 based on address data stored in a forwarding database. In one embodiment, the bridge elements 120 are managed by firmware executing on the IOMC 140. In the embodiment shown, at least one bridge element 120 in the switch unit 182 may be connected to an IOMC 140 to give the IOMC access to the switching layer 130. In one embodiment, the switch unit 182 and IOMCs 140 are hardware components (e.g., PCB boards, FPGA boards, system on a chip, etc.) that provide physical support and connectivity between the network adapters 115 and the bridge elements 120. While switch units 182 are configured as a Layer 2 Ethernet bridge for routing data frames (e.g., based on MAC address) in the embodiment described herein, it should be recognized that embodiments of the present disclosure may be applied to other forms of packet switching.

The bridge elements 120 are operatively connected to multiple bridge elements 120. In one embodiment, the bridge elements 120 are connected to each other using the switching layer 130 (e.g., via a mesh connection schema). As such, no matter the bridge element 120 used, a data packet can be routed to another bridge element 120 located on any other switch unit 182. In some embodiments, this may be accomplished by directly connecting each bridge element 120, i.e., each bridge element 120 having a dedicated direct data path to every other bridge element 120. Alternatively, in some embodiments, the switching layer 130 may use a spine-leaf architecture wherein each bridge element 120 (i.e., a leaf node) is attached to at least one spine node. The spine nodes route data packets received from the bridge elements 120 to the correct spine node, which then forward the data packet to the correct bridge element 120. In one embodiment, the bridge elements 120 may forward data frames to other bridge elements 120 in the same switch unit 182, or in different switch units 182 via switching layer 130.

The distributed network switch 180 may be configured to manage or control inbound and outbound traffic flow based on one or more predefined conditions. In one embodiment, the predefined conditions may be represented in the form of an access control list. As shown in FIG. 1, the IOMC 140 may manage one or more access control lists (ACLs) 150 that specify actions to be performed by a bridge element 120 when the predefined conditions are satisfied. The ACLs 150 compares a portion of network traffic (e.g., a frame header) to one or more of the conditions. If a condition is satisfied, the ACL instructs a bridge element 120 to perform a corresponding action. For example, the ACL may include a condition that if the TCP source port is greater than 1023 (i.e., the condition) then the packet should be discarded (i.e., the action). Accordingly, the action is performed only if the action is true. The actions may apply to utilization metrics, network security, Quality of Service (QoS), prioritization, power conservation, and the like. The ACLs 150 may be implemented in a variety of embodiments. For example, the ACLs may be implemented using ternary content-addressable memory (TCAM), content-addressable memory (CAM), and condition selection logic. In one implementation, the ACLs 150 may be defined as a match-mask flat array of fields, where different data fields define the array that hardware uses to match and execute an assigned action.

The distributed network switch 180 may be further configured to logically separate traffic on a physical network connection (e.g., a physical port) into multiple channels, referred to as S-channels, as if they were independent, parallel connections to the network. Each S-channel may be assigned to a VM 111, network adapter 115, virtual bridge 114 connected to the distributed network switch 180. In one embodiment, the IOMC 140 may be configured to assign and manage a plurality of service tags (S-Tags) 154 which are identifiers used to tag network traffic to enable multiple S-channels. The distributed network switch 180 recognizes, inserts, and removes S-Tags 154 associated with S-channels from network traffic flowing through the distributed network switch 180. As described in greater detail below, the IOMC 140 may assign particular S-Tags for network traffic such that one or more ACLs 150 defined for specified Logical Ports may be configured to trigger on traffic for a particular logical network in the distributed network switch 180.

Figure 2:
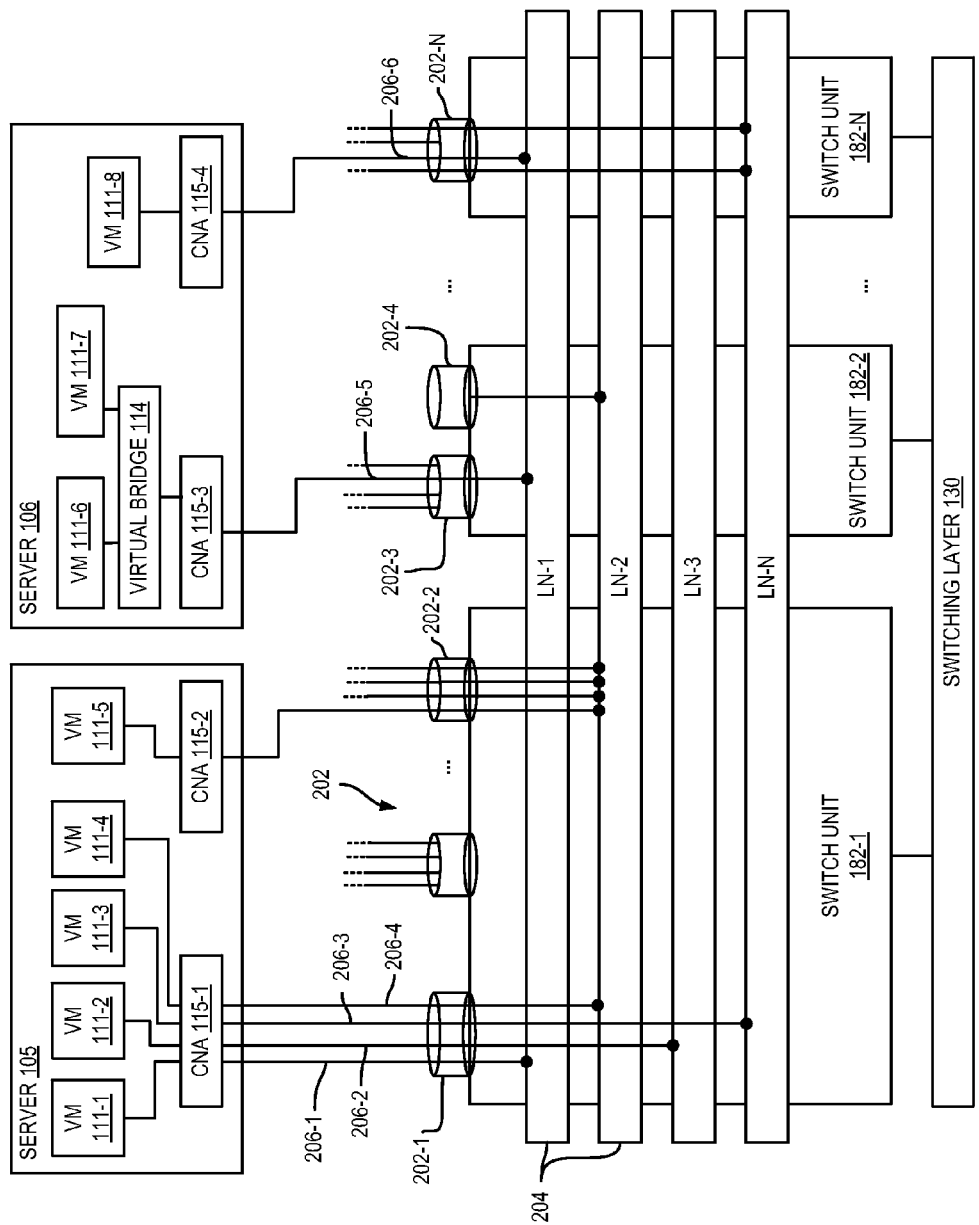
FIG. 2 illustrates a hardware representation of a system that implements a distributed network switch, according to one embodiment of the invention.

FIG. 2 illustrates the distributed network switch 180 having a plurality of switch units 182-1, 182-2, and 182-N connected to servers 105 and 106 via a plurality of physical ports 202-1, 202-2, 202-3, 202-4, 202-N, according to one embodiment of the invention. In one embodiment, the distributed network switch 180 disclosed herein is configured to provide Layer 2 Ethernet switching via multiple switch units 182, the switching layer 130 interconnecting the switch units 182, and management firmware executing on a management controller, such as IOMCs 140. Doing so may eliminate the need for stand-alone Ethernet switches to interconnect processing elements in the servers 105, 106. As such, a system networked using the distributed network switch 180 may also be augmented in a granular and scalable manner by adding individual components such as switch units 182 or other processing elements.

In one embodiment, the switch units 182 are physical units configured to be logically partitioned into a plurality of logical switch partitions 204. Each logical switch partition, interchangeably referred to as a logical network (LN), may have a respective LN identifier and may include a respective, logically specified network portion of the distributed network switch. The logical networks behave as independent Layer 2 domains even though the domains may co-exist on the same physical switch unit 182, and provide a layer of traffic separation. The logical switch partitions 204 enable the hardware resources of the switch units 182 to be flexibly allocated between logical networks.

In one embodiment, a switch unit 182 may be configured to divide each physical port 202 into one or more logical ports such that network traffic on the physical port 202 is separated into multiple logical channels, referred to as service channels or S-channels. Each S-channel may operate as an independent, parallel connection to the distributed network switch 180. For example, the physical port 202 is divided into logical ports 206-1, 206-2, 206-3, and 206-4. VMs 111 running on the servers 105 and 106 may be connected to different logical ports 206. As shown in FIG. 2, the VMs 111-1, 111-2, 111-3, 111-4 running on the server 105 are connected to the logical ports 206-1, 206-2, 206-3, 206-4, respectively, of the first physical port 202-1 via converged network adapter (CNA) 115-1. Another VM 111-5 running on the server 105 is connected to logical port 206 of the physical port 202-2 via CNA 115-2. The VMs 111-6 and 111-7 running on the second server 106 are connected to a logical port 206-5 of the physical port 202-3 via the virtual bridge 114 and CNA 115-3. The VM 111-6 running on the second server 106 is connected to the logical port 206-6 of the physical port 202-N via the CNA 115-4.

When a logical port 206 is active, network traffic (e.g., Ethernet frames) flowing through the logical port 206 are tagged with an "outer" service tag, or S-Tag 154, that can be used to identify which logical port 206 of the physical port 202 the frame is associated with.

According to one embodiment of the present invention, the distributed network switch 180 is configured to set up ACL rules triggered against a logical port 206. As a given logical port may be associated with one and only one logical switch partition 204, the IOMC 140 may be configured to set up and manage ACLs 150 targeting a logical port across the distributed network switch 180 (e.g., via the switching layer 130) and measure, or capture, traffic related to the logical port, and therefore the desired logical switch partition 204.

Figure 3:
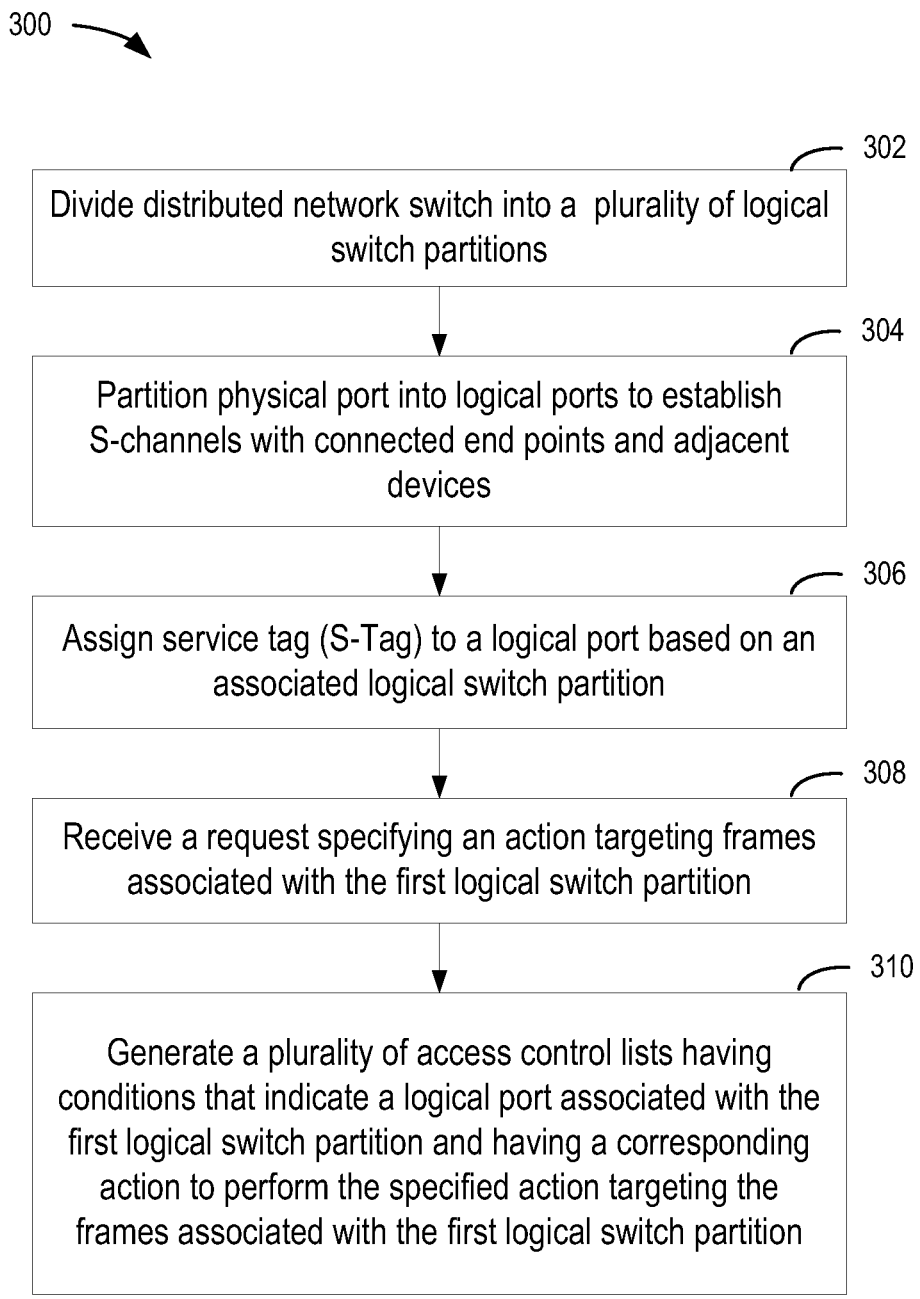
FIG. 3 is a flowchart depicting a method for generating access control lists for a logical switch partition in the distributed network switch, according to one embodiment of the invention.

FIG. 3 is a flowchart depicting a method 300 for managing ACLs for the distributed network switch 180, according to one embodiment of the invention. While the method is described as being performed by systems of FIGS. 1 and 2, including a distributed network switch 180 divided into a plurality of logical switch partitions 204, other embodiments are may be used.

As shown, the method 300 begins at step 302, where the distributed network switch 180 is divided into a plurality of logical switch partitions 204. In the embodiment shown in FIG. 2, the switch units 182 are configured to support four different logical switch partitions 204, identified LN-1, LN-2, LN-3, and LN-N. As shown, a logical switch partition 204 may span several switch units 182, even across switch units that are in different chassis that may be interconnected by the switching layer 130. A logical switch partition 204 need not be restricted to a particular switch unit 182, and may comprise ports from different physical switch units 182. For example, the logical switch partition LN-2 is associated with a port from switch unit 182-1 and a port from another switch unit 182-2.

At step 304, a switch unit 182 partitions one or more physical ports 202 into a plurality of logical ports 206 to establish S-channels with connected end points and adjacent devices. A switch unit 182 partitions a physical port 202 into logical ports 206 such that a given logical port 206 is associated with a logical switch partition 204. In the example shown in FIG. 2, the logical port 206-1 belongs to the logical switch partition LN-1. In some embodiments, a given logical port 206 may be associated with one and only logical switch partition 204.

In some embodiments, logical ports 206 can be members of a logical switch partition 204 across different physical switch units 182. For example, as shown in FIG. 2, the logical port 206-1 (from the physical port 202-1 of the switch unit 182-1) and the logical port 206-5 (from the physical port 202-3 of the switch unit 182-2) belong to the same logical switch partition LN-1. As such, for example, the VM 111-1 executing on the server 105 may connect, via CNA 115-1 and using the logical port 206-1 of the first physical port 202-1, to the VM 111-6 executing on the second server 106 via virtual bridge 114, which is connected to CNA 115-3 via the logical port 206-5 of the physical port 202-3 on switch unit 182-2, both VMs being on the same logical switch partition LN-1.

In some embodiments, the logical port connections may be different across physical ports. For example, the logical ports of the physical port 202-1 are each members of a different logical switch partition 204, while the logical ports of the physical port 202-2 are all members of the same logical switch partition LN-2. It should be recognized that some physical ports 202 may not be partitioned into logical ports (as depicted by the physical port 202-4 of the switch unit 182-2), some physical ports may have logical ports that are not connected to a logical switch partition, and some physical ports may have logical ports that are connected to a logical switch partition and some that are not (as depicted by the logical ports of physical port 202-3).

At step 306, the switch unit 182 assigns a service tag (S-Tag) 154 to a logical port 206 based on the logical switch partition 204 associated with the logical port. In some embodiments, to establish one or more S-channels, the switch units 182 communicate with connected end points (e.g., servers 105 and 106) through a negotiation procedure, for example, according to an S-Channel discovery and configuration protocol, and agree on an S-Tag 154 that any network traffic corresponding to a logical port 206 should be tagged with. S-Tag 154 may be used to specify an Ethernet frame is associated with the given logical port. For example, the S-Tag 154 may be used by the switch units 182 to tag egress frames, and by the adjacent devices (e.g., CNA 115, virtual bridge 114) connected via logical ports to tag any ingress frames. In one embodiment, the S-Tag 154 may be a frame field inserted into an Ethernet frame, similar to VLAN identifiers specified by the IEEE 802.1Q networking protocol. The S-Tag 154 may include a tag protocol identifier (TPID) specifying an S-Tag format (e.g., a TPID of 0x88a8 for a service-provider outer S-Tag). The S-Tag 154 further includes an identifier value associated with a logical port of a given physical port. As described above, the values of the S-Tag 154 may be assigned and managed by a control point (e.g., IOMC 140) of the switch unit 182.

In one embodiment, the switch unit 182 (e.g., by operation of the IOMC 140) assigns an S-Tag 154 according to the logical switch partition 204 associated with the logical port 206. In some embodiments, the IOMC 140 may assign a same S-Tag 154 across all logical ports 206 belonging to a given logical switch partition 204. As such, a logical port 206 is associated with a single logical switch partition 204 such that an S-Tag 154 of an Ethernet frame specifying the S-channel of the frame further specifies the associated logical switch partition. In other embodiments, the IOMC 140 may assign various S-Tags 154, rather than a same S-Tag, for logical ports belonging to a given logical switch partition. In one implementation, IOMC 140 may maintain a mapping between S-Tags 154 used in the distributed network switch 180 and associated logical switch partitions 204. In other implementations, IOMC 140 may maintain a mapping between logical ports 206 and logical switch partitions 204 in the distributed network switch 180, for example, in a logical network/VLAN table (LNVT).

At step 308, the distributed network switch 180 receives a request that specifies an action targeting frames associated with a given logical switch partition 204 and received on a physical port (e.g., physical port 202). In one embodiment, the distributed network switch 180 receives a request to generate a metric (e.g., network utilization metrics) for network traffic associated with the given logical switch partition. For example, in cases where LNs have been used to support multi-tenancy implementations, the distributed network switch 180 may receive a request to capture metrics on a per-LN basis to be able to charge and provide on-demand services based on these metrics.

At step 310, a control point (e.g., IOMC 140) generates a plurality of ACLs 150 based on a logical port associated with the given logical switch partition 204. Each ACL 150 includes one or more rules. As used herein, a rule includes a condition and a corresponding action that is to be performed if that condition is satisfied. In one embodiment, the IOMC 140 generates ACLs having conditions that specify the logical port associated with the determined S-Tags 154 and further associated with the first logical switch partition and having a corresponding action to perform the specified action targeting frames associated with the first logical switch partition. In some embodiments, ACLs include corresponding actions to generate a metric (e.g., network utilization metric) associated with the first logical switch partition. For example, the IOMC 140 may generate an ACL rule to be active for a specified logical port, associated indirectly with the incoming frame's S-Tag (i.e., associated with the first logical switch partition), then a metric should be updated to include or count the frame.

According to an alternative embodiment, IOMC 140 may utilize S-Tag(s) directly in one or more ACLs. In such an embodiment, responsive to receiving a request specifying an action targeting frames associated with the first logical switch partition, IOMC 140 determines one or more S-Tags 154 associated with logical ports belonging to the first logical switch partition. The IOMC 140 may retrieve the S-Tag 154 that has been assigned to identify traffic on logical ports belonging to the first logical switch partition. In other embodiments, the IOMC 140 retrieves various S-Tags 154 that have been assigned to identify traffic on logical ports belonging to the first logical switch partition.

Further, IOMC 140 generates a plurality of ACLs 150 based on the determined S-Tags. The IOMC 140 may generates ACLs having conditions that specify the S-Tag(s) associated with the logical port and the first logical switch partition and having a corresponding action to perform the specified action targeting frames associated with the first logical switch partition. For example, the IOMC 140 may generate an ACL rule having a condition that if the S-Tag of a frame is equal to the S-Tag(s) associated with the first logical switch partition, then a metric should be updated to count the frame.

In some embodiments, the ACLs 150 managed by the IOMC 140 of a given switch unit 182 may be shared by bridge elements 120 of the same switch unit. The ACLs 150 may further be synchronized with other switch units 182 of the distributed network switch 180 such that the other switch units 182 obtain copies of the generated ACLs. Accordingly, the IOMC 140 may assign, manage, and install one or more ACLs 150 across all logical ports belonging to a given logical switch partition (including across switch units 182) and assign corresponding action (e.g., metering of traffic for an on-demand feature).

While embodiments of the present invention discuss in detail a technique for generating metrics targeting a logical switch partition of the distributed network switch, it should be recognized that techniques described herein may be extended to define other types of rules targeting a given logical switch partition. For example, the distributed network switch may define a rule that targets a given logical network and includes a corresponding forwarding action (e.g., forward traffic for the logical network to a given address), a discarding action (e.g., drop any frames for the logical network), and other suitable actions that provide utilization metrics, network security, Quality of Service (QoS), prioritization, and power conservation.

Figure 4:
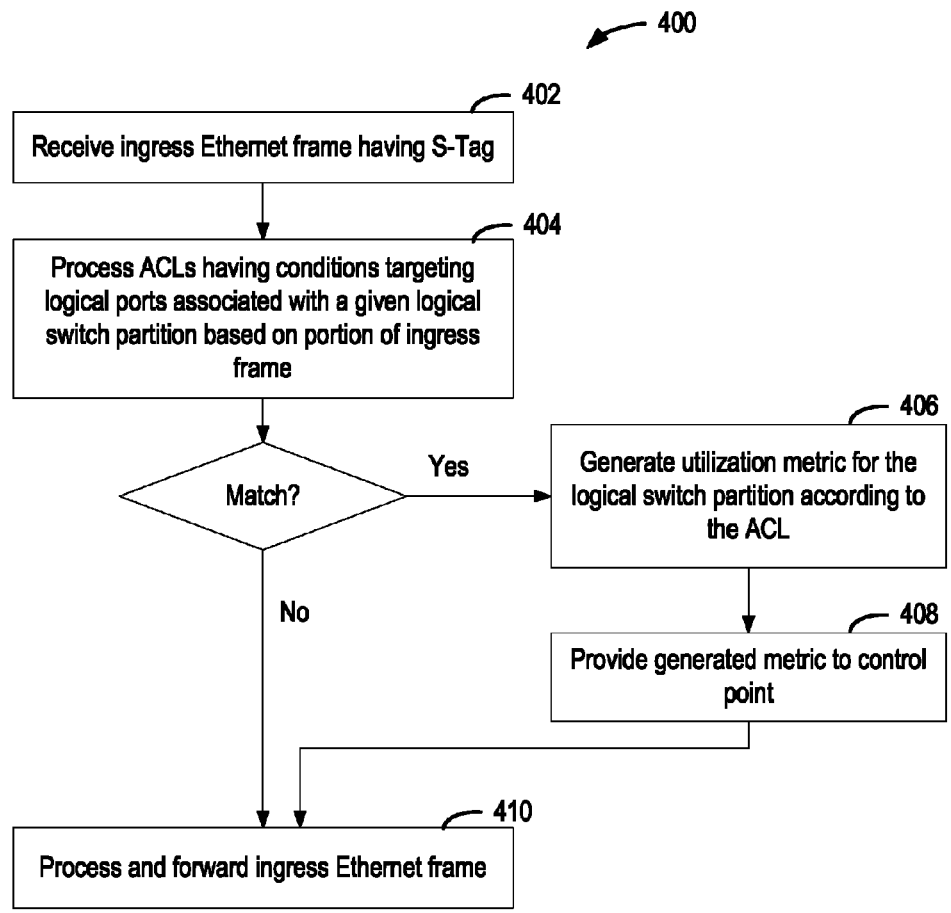
FIG. 4 is a flowchart depicting a method for processing an access control list for a logical switch partition in the distributed network switch, according to one embodiment of the invention.

FIG. 4 is a flowchart depicting a method 400 for processing ACLs for the distributed network switch 180, according to one embodiment of the invention. As shown, the method 400 begins at step 402, where a bridge element 120 of the distributed network switch 180 receives an ingress Ethernet frame having routing information such as a source address, a destination address, and an S-Tag. For example, one of the bridge elements 120 of the first switch unit 182-1 receives a data frame at one of its physical ports 202 connected to a server 105. As described above, prior to arriving at the bridge element 120, the ingress Ethernet frame may have been tagged by connected end points and adjacent devices (e.g., network adapter 115, virtual bridge 114) with an S-tag identifying the logical port to which the frame is associated with. The S-Tag 154 may be a data field included in the frame as an outer part of a "tag stack" that includes other VLAN identifiers.

At step 404, the bridge element 120 processes the one or more ACLs 150 having conditions that target logical ports associated with a given logical switch partition based on a portion of the received frame. In one embodiment, the bridge element 120 translates the S-Tag 154 contained in the received ingress frame to its associated logical port. The bridge element 120 then uses the logical port to match one or more ACLs 150 that target logical ports associated with a given logical switch partition. If the condition of the ACL 150 is satisfied (i.e., the logical port associated with the S-Tag of the ingress frame matches), then at step, 406, the bridge element 120 performs the corresponding action of the ACL 150. Otherwise, the bridge element 120 proceeds to further processing of the ingress frame at step 410. In an alternative embodiment of ACLs having conditions that specify one or more S-Tag(s) associated with the given logical switch partition, bridge element 120 compares the S-Tag portion of a received frame to conditions of the one or more ACLs 150 that target S-tags associated with logical ports mapped to the given logical switch partition. If the condition of the ACL 150 is satisfied (i.e., the S-Tag of the ingress frame matches), then, the bridge element 120 performs the corresponding action of the ACL 150. In one embodiment, the bridge element 120 generates one or more utilization metrics for the logical switch partition according to the corresponding action of the ACL. For example, the bridge element 120 may update (e.g., increment) a utilization metric specifying an amount of network traffic received by the bridge element 120 associated with the particular logical switch partition.

At step 408, the bridge element 120 may provide the generated metric to a control point (e.g., IOMC 140) that aggregates the various metrics generated the bridge elements 120 of the distributed network switch 180. In some embodiments, a control point (e.g., IOMC 140) may periodically retrieve generated metrics from each of the bridge elements 120.

At step 410, the bridge element 120 proceeds with further processing of the ingress frame. In one embodiment, the bridge element 120 may access an S-Tag table to determine a logical switch partition identifier associated with the S-Tag of the ingress frame. In some embodiments, the bridge element 120 may access a forwarding database to determine a forwarding address for the ingress frame based on a key comprised of the logical switch partition identifier, a VLAN identifier, and the S-Tag. The bridge element 120 may then forward the Ethernet frame according to the determined forwarding address.

While the foregoing is directed to embodiments of the present invention, other and further embodiments of the invention may be devised without departing from the basic scope thereof, and the scope thereof is determined by the claims that follow.

What is claimed is:

1. A method for providing metrics for a distributed network switch comprised of a plurality of logical switch partitions including a first logical switch partition, the method comprising:

establishing, via a negotiation procedure with an end point connected to the distributed network switch, a logical channel (S-channel) to the connected end point, wherein the S-channel corresponds to a logical port that is associated with the first logical switch partition and that is partitioned from a physical port of the distributed network switch;

receiving a request that specifies an action targeting frames associated with the first logical switch partition;

determining a service tag assigned to the logical port associated with the first logical switch partition, wherein the service tag was assigned by the negotiation procedure to be used for network traffic exchanged on the S-channel; and generating a plurality of access control lists (ACLs) having conditions that specify logical ports associated with the determined service tag and a corresponding action to perform the specified action targeting frames associated with the first logical switch partition.

2. The method of claim 1, wherein a plurality of logical ports, which includes the logical port, belonging to a same logical switch partition are assigned a same service tag.

3. The method of claim 1, wherein each logical port is exclusively associated with a logical switch partition.

4. The method of claim 1, wherein the receiving the request that specifies the action further comprises:
    receiving a request to generate a metric for network traffic associated with the first logical switch partition.

5. The method of claim 4, wherein the plurality of access control lists further comprise a corresponding action to generate the metric associated with the first logical switch partition.

6. The method of claim 1, wherein the performing the corresponding action further comprises:
    generating a utilization metric associated with the first logical switch partition and based on a received first frame; and
    providing the generated utilization metric to a control point of the distributed network switch configured to aggregate utilization metrics, which includes the generated utilization metric, from a plurality of bridge elements of the distributed network switch.

7. The method of claim 1, wherein the method further comprises:
    receiving, at a first bridge element of the distributed network switch, a first frame having a service tag specifying a logical port associated with the first frame;
    comparing the logical port specified by the service tag of the first frame to conditions of the plurality of ACLs; and
    responsive to determining the logical port specified by the service tag of the first frame satisfies a condition of one of the plurality of ACLs, executing the corresponding action to perform the specified action targeting frames associated with the first logical switch partition.

8. The method of claim 1, wherein the distributed network switch comprises at least one physical switch unit, and wherein the plurality of logical switch partitions are configured to operate as independent Layer 2 domains.

9. The method of claim 1, wherein the plurality of logical switch partitions are a plurality of logical networks (LNs).

* * * * *